United States Patent
Schirmeister et al.

(10) Patent No.: US 12,257,767 B2
(45) Date of Patent: Mar. 25, 2025

(54) POLYPROPYLENE FOR EXTRUSION ADDITIVE MANUFACTURING

(71) Applicants: Basell Polyolefine GmbH, Wesseling (DE); Albert-Ludwigs-Universität Freiburg, Freiburg (DE)

(72) Inventors: Carl Schirmeister, Denzlingen (DE); Karsten Schmitz, Hofheim/Ts. (DE); Yannic Kessler, Kriftel (DE); Rainer Köhler, Pegnitz (DE); Erik Licht, Mainz (DE); Shahram Mihan, Bad Soden (DE); Jürgen Rohrmann, Kelkheim (DE); Dieter Langenfelder, Niedernhausen (DE); Rolf Muelhaupt, Freiburg (DE); Timo Hees, Freiburg (DE)

(73) Assignees: Basell Polyolefine GmbH, Wesseling (DE); Albert-Ludwigs-Universität Freiburg, Freiburg (DE)

( * ) Notice: Subject to any disclaimer, the term of this patent is extended or adjusted under 35 U.S.C. 154(b) by 70 days.

(21) Appl. No.: 17/766,442

(22) PCT Filed: Sep. 28, 2020

(86) PCT No.: PCT/EP2020/077034
§ 371 (c)(1),
(2) Date: Apr. 4, 2022

(87) PCT Pub. No.: WO2021/069242
PCT Pub. Date: Apr. 15, 2021

(65) Prior Publication Data
US 2024/0051221 A1  Feb. 15, 2024

(30) Foreign Application Priority Data
Oct. 7, 2019 (EP) .................... 19201694

(51) Int. Cl.
B29C 64/118 (2017.01)
B29K 23/00 (2006.01)
(Continued)

(52) U.S. Cl.
CPC .............. B29C 64/118 (2017.08); C08K 7/14 (2013.01); C08L 23/0815 (2013.01);
(Continued)

(58) Field of Classification Search
CPC ... B29C 64/118; C08K 7/14; C08K 2201/004; C08K 2201/005; C08K 3/40;
(Continued)

(56) References Cited

U.S. PATENT DOCUMENTS

2006/0189744 A1* 8/2006 Tse .......................... C08L 23/20
524/451
2016/0297103 A1* 10/2016 Lee .......................... D01F 1/10
(Continued)

FOREIGN PATENT DOCUMENTS

CN 103992560 A 8/2014
CN 104086891 A 10/2014
(Continued)

OTHER PUBLICATIONS

The International Search Report and The Written Opinion for PCT/EP2020/077034 mailed Dec. 4, 2020.

*Primary Examiner* — Ziaul Karim

(57) ABSTRACT

A process for producing articles with an extrusion-based additive manufacturing system using a consumable filament made from or containing a propylene polymer composition made from or containing:
A) from 20% to 60% by weight of a heterophasic propylene copolymer;
B) from 5% to 33% by weight of a propylene homopolymer or copolymer, wherein the copolymer contains up to 5% by weight of an alpha olefin;
(Continued)

C) from 2% to 15% by weight of an elastomeric block copolymer made from or containing styrene;
D) from 4% to 32% by weight of an elastomeric ethylene copolymer;
E) from 5% to 50% by weight of a glass material as filler; and
F) from 0.1% to 5% by weight of compatibilizer.

11 Claims, 2 Drawing Sheets

(51) Int. Cl.
*B29K 25/00* (2006.01)
*B33Y 10/00* (2015.01)
*B33Y 70/00* (2020.01)
*B33Y 80/00* (2015.01)
*C08K 7/14* (2006.01)
*C08L 23/0807* (2025.01)
*C08L 23/12* (2006.01)
*C08L 23/16* (2006.01)
*C08L 25/08* (2006.01)
*C08L 51/06* (2006.01)
*C08L 53/00* (2006.01)

(52) U.S. Cl.
CPC ............. *C08L 23/12* (2013.01); *C08L 23/16* (2013.01); *C08L 25/08* (2013.01); *C08L 51/06* (2013.01); *C08L 53/00* (2013.01); *B29K 2023/08* (2013.01); *B29K 2023/12* (2013.01); *B29K 2023/14* (2013.01); *B29K 2025/08* (2013.01); *B33Y 10/00* (2014.12); *B33Y 70/00* (2014.12); *B33Y 80/00* (2014.12); *C08K 2201/004* (2013.01); *C08K 2201/005* (2013.01); *C08L 2205/22* (2013.01); *C08L 2207/02* (2013.01); *C08L 2207/04* (2013.01)

(58) Field of Classification Search
CPC ...... C08L 23/0815; C08L 23/12; C08L 23/16; C08L 25/08; C08L 51/06; C08L 53/00; C08L 2205/22; C08L 2207/02; C08L 2207/04; C08L 2203/12; C08L 2205/035; C08L 23/14; C08L 53/02; B29K 2023/08; B29K 2023/12; B29K 2023/14; B29K 2025/08; B33Y 10/00; B33Y 70/00; B33Y 80/00; B33Y 30/00; B33Y 70/10; C04B 2111/00137; C04B 16/0633; C04B 26/045; C04B 2111/00181
See application file for complete search history.

(56) References Cited

U.S. PATENT DOCUMENTS

2019/0232554 A1* 8/2019 De Palo ................. B29C 64/118
2019/0284381 A1* 9/2019 Grestenberger ....... C08J 9/0061

FOREIGN PATENT DOCUMENTS

| | | |
|---|---|---|
| CN | 108641197 A | 10/2018 |
| CN | 109071723 A | 12/2018 |
| CN | 109071724 A | 12/2018 |
| CN | 109790647 A | 5/2019 |
| EP | 3067389 A1 | 9/2016 |
| EP | 3333221 A1 | 6/2018 |
| WO | 2018069025 A1 | 4/2018 |
| WO | 2021063855 A1 | 4/2021 |

* cited by examiner

POLYPROPYLENE FOR EXTRUSION ADDITIVE MANUFACTURING

This application is the U.S. National Phase of PCT International Application PCT/EP2020/077034, filed Sep. 28, 2020, claiming benefit of priority to European Patent Application No. 19201694.7, filed Oct. 7, 2019, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to an extrusion additive manufacturing process.

BACKGROUND OF THE INVENTION 3D printing involves movement of an extrusion head with respect to a substrate under computer control, in accordance with build data that represents the 3D article. The build data is obtained by initially slicing the digital representation of the 3D article into multiple horizontally sliced layers. For each sliced layer, the host computer generates a build path for depositing roads of build material to form the 3D article.

An extrusion-based 3D printer is used to build a 3D printed article from a digital representation of the 3D article in a layer-by-layer manner by extruding a flowable build material. The build material is molten and extruded through an extrusion die carried by an extrusion head. Next, the build material is deposited as a sequence of layers, also called "roads" on a substrate in an x-y plane. The extruded build material fuses to previously deposited build material and solidifies upon a drop in temperature. The distance of the extrusion head relative to the substrate is incremented along the z-axis (perpendicular to the x-y plane). The process is repeated to form a 3D article resembling the digital representation. Alternatively, the substrate moves while the extrusion die is stationary. In some instances, a filament-free extrusion-based 3D printing process is commercially available from ARBURG GmbH & Co. KG.

In some instances, Fused Deposition Modeling (FDM) extrusion additive manufacturing process (or Fused Filament Fabrication (FFF)) is used with a 3D printer to feed the build material to the extrusion section in form of a filament.

In some instances, filaments of polylactic acid (PLA) or acrylonitrile, butadiene, styrene (ABS) polymer or polyamides are used.

In some instances, polyolefins, like polypropylene, are processable with extrusion-based 3D printers.

In some instances, it is believed that warping results from material shrinkage while 3D printing, thereby causing the corners of the print to lift and detach from the build plate. When plastics are printed, the plastics first expand and then contract as the plastics cool down. If material contracts too much, the print bends up from the build plate and yields deformed 3D printed objects.

SUMMARY OF THE INVENTION

In a general embodiment, the present disclosure provides a process for producing articles with an extrusion-based additive manufacturing system using a consumable filament made from or containing a propylene polymer composition made from or containing:

A) from 20% to 60% by weight of a heterophasic propylene copolymer;
B) from 5% to 33% by weight of a propylene homopolymer or copolymer, wherein the copolymer contains up to 5% by weight of an alpha olefin selected from the group consisting of ethylene, 1-butene, 1-hexene and 1-octene;
C) from 2% to 15% by weight of an elastomeric block copolymer made from or containing styrene;
D) from 4% to 32% by weight of an elastomeric ethylene copolymer;
E) from 5% to 50% by weight of a glass material as filler; and
F) from 0.1% to 5% by weight of a compatibilizer;

wherein the amounts of components A), B), C), D), E) and F) are referred to the total weight of A), B), C), D), E) and F), which amounts to 100% and wherein the melt flow rate MFR at 230° C. with a load of 2.16 kg, according to ISO 1133-2:2011, is at least 1.0 g/10 min.

DETAILED DESCRIPTION OF THE INVENTION

Figure 1:
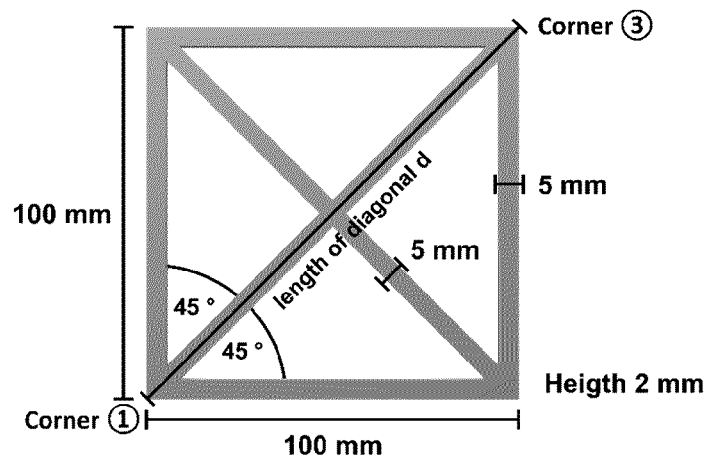
FIG. 1 is the top view of a specimen used for warpage test, including the naming of the corners and the length of the diagonal relevant for the measurement carried out.

In some embodiments, the present disclosure provides a process for producing articles with an extrusion-based additive manufacturing system using a consumable filament made from or containing a propylene polymer composition made from or containing:

A) from 20 wt % to 60 wt %; alternatively from 25 wt % to 52 wt %; alternatively from 31 wt % to 46 wt %, of a heterophasic propylene copolymer;
B) from 5 wt % to 33 wt %; alternatively from 8 wt % to 23 wt %; alternatively from 9 wt % to 18 wt %, of a propylene homopolymer or copolymer, wherein the copolymer contains up to 5 wt % of an alpha olefin selected from the group consisting of ethylene, 1-butene, 1-hexene and 1-octene;
C) from 2 wt % to 15 wt %; alternatively from 3 wt % to 10 wt %, of an elastomeric block copolymer made from or containing styrene;
D) from 4% to 32%; alternatively from 6 wt % to 23 wt %; alternatively from 8 wt % to 18 wt %, of an elastomeric ethylene copolymer;
E) from 5wt % to 50 wt %; alternatively from 10wt % to 35 wt %; alternatively from 15 wt % to 29 wt %; alternatively from 18 wt % to 28 wt %, of a glass material as filler; and F) from 0.1 wt % to 5 wt %; alternatively from 0.3 wt % to 3 wt %; alternatively from 0.5 wt % to 2 wt %, of a compatibilizer;

wherein the amounts of components A), B), C), D), E) and F) are referred to the total weight of A), B), C), D), E) and F), which amounts to 100%, and wherein the melt flow rate MFR at 230° C. with a load of 2.16 kg, according to ISO 1133-2:2011, is at least 1.0 g/10 min; alternatively from 3 g/10 min to 100 g/10 min.

In some embodiments, the present disclosure provides a process for producing articles with an extrusion-based additive manufacturing system including the step of extruding a flowable build material in the form of filament made from or containing the propylene polymer composition.

A) Heterophasic Propylene Copolymer

As used herein, the term "heterophasic propylene copolymer" refers to a copolymer wherein a rubber phase is (finely) dispersed in the matrix, that is, in a propylene homopolymer or copolymer. In some embodiments, the rubber phase forms inclusions in the matrix. In some embodiments, the matrix contains (finely) dispersed inclusions being not part of the matrix, wherein the inclusions contain the rubber phase. As used herein, the term "inclusion" refers to the matrix and the inclusion forming different phases within the heterophasic system. In some embodiments, the inclusions are visible by high-resolution microscopy. In some embodiments, the high-resolution microscopy is selected from the group consisting of electron microscopy and scanning force microscopy.

In some embodiments, the matrix of the heterophasic propylene ethylene content is propylene homopolymer or propylene ethylene copolymer having an ethylene content up to 10 wt %; alternatively up to 5 wt %; and having a fraction soluble in xylene at 25° C. lower than 10 wt %; alternatively lower than 5 wt %; alternatively lower than 3 wt %. In some embodiments, Component A has a MFR (ASTM D 1238-13 230° C./2.16 Kg, equivalent to ISO 1133) of 0.1-100 g/10 min, alternatively 1-60 g/10 min, alternatively 1.5-60 g/10 min. In some embodiments, the matrix is a propylene homopolymer.

In some embodiment, the rubber phase is: (i) a propylene ethylene copolymer having an ethylene content ranging from 15 wt % to 75 wt %; alternatively from 20 wt % to 65 wt %. In some embodiment, the rubber phase is: (ii) an ethylene-C4-C8 alpha olefin copolymer having an ethylene content ranging from 35 wt % to 70 wt %; alternatively from 43 wt % to 65 wt %. In some embodiments, the alpha olefin is selected from the group consisting of 1-butene, 1-hexene and 1-octene. In some embodiments, the alpha olefin is 1-butene. In some embodiments, the rubber phase cis (iii) a mixture of propylene ethylene copolymer and ethylene-C4-C8 alpha olefin copolymer. In some embodiments, the rubber phase is a mixture of propylene ethylene copolymer and ethylene-C4-C8 alpha olefin copolymer.

In some embodiments, the matrix in the heterophasic propylene copolymer ranges from 30 wt % to 70 wt %; alternatively from 42 wt % to 63 wt %, referred to the total weight of the heterophasic copolymer and the remaining part, up to 100 wt %, being the rubber phase. In some embodiments, the rubber phase is a mixture of propylene ethylene copolymer and ethylene-C4-C8 alpha olefin copolymer while the propylene ethylene copolymer ranges from 33 wt % to 65 wt % and the ethylene-C4-C8 alpha olefin copolymer ranges from 33 wt % to 65 wt % referred to the total rubber phase. In some embodiments, the matrix is a propylene homopolymer and the rubber phase is a mixture of propylene ethylene copolymer and ethylene-C4-C8 alpha olefin copolymer.

B) Propylene Homopolymer or Copolymer

In some embodiments, the propylene homopolymer or copolymer is a propylene homopolymer or propylene ethylene copolymer having an ethylene content up to 10 wt %; alternatively up to 5 wt %. In some embodiments, Component B has a fraction soluble in xylene at 25° C. lower than 10 wt %; alternatively lower than 5 wt %; alternatively lower than 3 wt %. In some embodiments, Component B has a MFR (ASTM D 1238-13 230° C./2.16 Kg, equivalent to ISO 1133) of 10-3000 g/10 min, alternatively 100-2500 g/10 min, alternatively 500-2500 g/10 min. In some embodiments, component B is a propylene homopolymer. In some embodiments, component B) is obtained by using metallocene-based catalysts.

In some embodiments, the component B) is a propylene homopolymer having a fraction soluble in xylene at 25° C. lower than 5% by weight, alternatively lower than 3% by weight.

C) An Elastomeric Block Copolymer Made From or Containing Styrene

In some embodiments, elastomeric block copolymer made from or containing styrene is selected from the group consisting styrene-ethylene/butylene-styrene block copolymers, styrene-ethylene/propylene-styrene block copolymers, styrene-butadiene-styrene block copolymers, and styrene-isoprene-styrene block copolymers containing from 5 wt % to 30 wt % of polystyrene and having a hardness (Shore A, ASTM D-2240-15) value equal to or lower than 70 points, alternatively equal to or lower than 55 points, alternatively equal to or lower than 50 points.

D) Elastomeric Ethylene Copolymer

In some embodiments, the elastomeric ethylene copolymer has a hardness (Shore A, ASTM D-2240-15) value equal to or lower than 80 points, alternatively equal to or lower than 60 points, alternatively equal to or lower than 55 points. In some embodiments, the elastomeric ethylene copolymer has a MFR (ASTM D 1238-13 190° C./2.16 Kg, equivalent to ISO 1133) of 0.5-20 g/10 min, alternatively 0.5-3 g/10 min, alternatively 0.9-1.5 g/10 min.

In some embodiments, the elastomeric ethylene copolymer is selected from copolymers of ethylene with a ($C_3$-$C_{10}$) α-olefin containing at least 20 wt alternatively from 20 to 70 wt %, of $C_3$-$C_{10}$ α-olefin (13C-NMR analysis). In some embodiments, the elastomeric ethylene copolymer is obtained with metallocene or constrained geometry catalysis. In some embodiments, the elastomeric ethylene copolymer is commercially available. In some embodiments, the elastomeric ethylene copolymers have a molecular weight distribution (Mw/Mn measured via GPC) of from 1 to 3.

In some embodiments, the elastomeric ethylene copolymer Components (C) are:
(i) elastomeric copolymers of ethylene with 1-octene having from 20 wt % to 45 wt % of 1-octene (13C-NMR analysis); or
(ii) elastomeric thermoplastic copolymers of ethylene with 1-butene having from 20 wt % to 40 wt % of 1-butene (13C-NMR analysis). In some embodiments, the elastomeric copolymers of ethylene with 1-octene (i) have density of less than 0.89 g/ml (measured according to ASTM D-792). In some embodiments, the elastomeric thermoplastic copolymers of ethylene with 1-butene (ii) have density of less than 0.89 g/ml (measured according to ASTM D-792).

In some embodiments, the copolymer (ii) is an ethylene-butene-1 random copolymer rubber ENGAGE 7467 produced by The Dow Chemical Co. Ltd., having density of 0.862 g/cm$^3$ according to method ASTM D 792-08, MFR of 1.2 g/10 min (ASTM D 1238-13 190° C./2.16 Kg, equivalent to ISO 1133), hardness Shore A (ASTM D-2240-15) of 52.

E) Glass Material as Filler

In some embodiments, the glass material filler component E) of the polypropylene composition is made from or containing glass fibers or chopped glass fibers, glass particles in the form of ground glass or milled glass fibers, or a mixture thereof. In some embodiments, the glass fibers' or chopped glass fibers' average length is from 10 μm to 20 mm. In some embodiments, the ground glass' or milled glass fibers' average particle size is in the range from 3 μm to 5 mm.

In some embodiments, the glass material filler component E) of the polypropylene composition is made from or containing glass fibers or chopped glass fibers whose average length is from 10 μm to 400 μm, alternatively from 50 μm to 200 μm, glass particles in the form of ground glass or milled glass fibers whose average particle size is in the range from 3 μm to 100 μm, hollow glass bubbles whose average diameter is from 1 μm to 150 μm, or mixtures thereof.

F) Compatibilizer

In some embodiments, the compatibilizer improves interfacial properties between glass material fillers and polymers. In some embodiments, the compatibilizer reduces the agglomeration tendency of filler particles, thereby improving their dispersion within the polymer matrix.

In some embodiments, the compatibilizer is selected from the group consisting of low molecular weight compounds having reactive polar groups for increasing the polarity of the polyolefin and which react with the functionalized coating or sizing of the fillers, thereby enhancing compatibility with the polymer. In some embodiments, the functionalized coatings of the fillers are silanes. In some embodiments, the silanes are selected from the group consisting of aminosilanes, epoxysilanes, amidosilanes and acrylosilanes. In some embodiments, the silane is an aminosilane.

In some embodiments, the compatibilizers are made from or containing a polymer modified (functionalized) with polar moieties and optionally a low molecular weight compound having reactive polar groups.

In some embodiments and in terms of structure, the modified polymers are graft or block copolymers. In some embodiments, the modified polymers contain groups deriving from polar compounds. In some embodiments, the polar compounds are selected from the group consisting of acid anhydrides, carboxylic acids, carboxylic acid derivatives, primary and secondary amines, hydroxyl compounds, oxazoline and epoxides, and ionic compounds.

In some embodiments, the polar compounds are selected from the group consisting of unsaturated cyclic anhydrides and their aliphatic diesters, and the diacid derivatives. In some embodiments, the polar compounds are selected from the group consisting of maleic anhydride, $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof.

In some embodiments, the compatibilizer is a propylene polymer grafted with maleic anhydride.

Polymers A), B), C), D) and F) are different from each other.

In some embodiments, the propylene polymer composition is further made from or containing additives. In some embodiments, the additives are selected from the group consisting of antioxidants, slipping agents, process stabilizers, antiacid and nucleants.

In some embodiments, the filament is further made from or containing wood powder, metallic powder, marble powder and similar materials. In some embodiments, these components affect the aesthetic appearances or mechanics of the 3D object.

In some embodiments, articles are prepared by an extrusion additive manufacturing process wherein the propylene polymer composition is at least partially molten at a temperature of from 120° C. to 300° C., alternatively 140° C. to 280° C., alternatively 160° C. to 240° C.

In some embodiments, the propylene polymer composition material is extruded and deposited as a sequence of layers to obtain a 3D article. When using an extrusion-based 3D printer, extrusion is carried out through an extrusion die carried by an extrusion head. In some embodiments and with filament-based extrusion additive manufacturing, the control of the deposition rate varies by setting the filament feed rate, filament cross sectional dimensions, and the rate of motion of the die head and/or article.

In some embodiments and with non-filament-based extrusion additive manufacturing, the control of the deposition rate varies by setting the throughput rate, the cross-sectional dimension of the die, and the rate of motion of the die head and/or article.

In some embodiments, the deposition is unidirectional or multidirectional or without orientation in case of the deposition of drops or beads.

In some embodiments, articles printed with the propylene polymer composition adhere for the timescale of the extrusion additive manufacturing process to smooth or rough glass or metal surface, using adhesive spray "Dimafix®" from Dima3D at a surface temperature higher than 70° C., alternatively higher than 90° C.

In some embodiments and after finishing the additive manufacturing process, the articles are removed at lower surface temperatures.

In some embodiments, the present disclosure provides a process for producing articles with an extrusion-based additive manufacturing system including the step of fusing deposited strands, drops, or beads of the propylene polymer composition.

The following examples are given to illustrate and not to limit the present disclosure.

EXAMPLES

The data of the propylene polymer materials were obtained according to the following methods:

Xylene-Soluble Fraction at 25° C.

The Xylene Soluble fraction was measured according to ISO 16152, 2005, but with the following deviations (the ISO 16152-specified conditions are within the parentheses).

The solution volume was 250 ml (200 ml).

During the precipitation stage at 25° C. for 30 min, the solution, for the final 10 minutes, was kept under agitation by a magnetic stirrer (30 min, without stirring).

The final drying step was done under vacuum at 70° C. (100° C.).

The content of the xylene-soluble fraction is expressed as a percentage of av original 2.5 grams sample and then, by difference (complementary to 100), the xylene insoluble %.

Ethylene (C2) Content $^{13}$C NMR spectra were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal reference at 29.9 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

PPP=100 $T_{\beta\beta}/S$ PPE=100 $T_{\beta\delta}/S$ EPE=100 $T_{\delta\delta}/S$ PEP=100 $S_{\beta\beta}/S$ PEE=100 $S_{\beta\delta}/S$ EEE=100 (0.25 $S_{\gamma\delta}$+ 0.5 $S_{\delta\delta}$)/S S=$T_{\beta\beta}$+$T_{\beta\delta}$+$T_{\delta\delta}$+$S_{\beta\beta}$+$S_{\beta\delta}$+0.25 $S_{\gamma\delta}$+0.5 $S_{\delta\delta}$ The molar percentage of ethylene content was evaluated using the following equation:

E% mol=100*[PEP+PEE+EEE]

The weight percentage of ethylene content was evaluated using the following equation:

$$E\ \%\ \text{wt.} = \frac{100 * E\ \%\ \text{mol} * MW_E}{E\ \%\ \text{mol} * MW_E + P\ \%\ \text{mol} * MW_P}$$

where P% mol is the molar percentage of propylene content, while $MW_E$ and $MW_P$ are the molecular weights of ethylene and propylene, respectively.

The product of reactivity ratio $r_1r_2$ was calculated according to Carman (C. J. Carman, R. A. Harrington and C. E. Wilkes, Macromolecules, 1977; 10, 536) as:

$$r_1r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP mm$T_{\beta\beta}$ (28.90-29.65 ppm) and the whole $T_{\beta\beta}$ (29.80-28.37 ppm).

Melt Flow Rate (MFR)

The melt flow rate MFR of the polymer and the composition were determined according to ISO 1133-2:2011 (230° C., 2.16 Kg).

Melt Temperature

The melting Temperatures were determined by differential scanning calorimetry (DSC). A sample, weighing (6±1) mg, was heated to (220±1)° C. at a rate of 10 K/min and kept at (220±1)° C. for 5 minutes in nitrogen stream. The sample was cooled at a rate of 10 K/min to (−30±1)° C. and then kept at this temperature for 10 min, thereby crystallizing the sample. Then, the sample was again fused at a temperature rise rate of 10 K/min up to (220±1)° C. The second melting scan was recorded. A thermogram was obtained. The temperatures corresponding to peaks were read. The differential scanning calorimeter used was DSC 6200 from Seiko. The data were evaluated with the software NETZSCH Proteus Thermal Analysis 6.1.0.

Mechanical Properties: Tensile Modulus, Tensile Strength, and Charpy Impact Strength Tensile Modulus and tensile strength were measured with tensile specimens DIN EN ISO 527-2 5A according to the procedure DIN EN ISO 527:2012. The tensile test machine used was ZWICK Z005, load cell 2.5 kN, makroXtens extensiometer.

Charpy impact strength was measured with specimens DIN EN ISO 179-1/1eA according to the procedure DIN EN ISO 179-1. The impact test machine used was Zwick 5102.100/00 pendulum impact tester The test specimens were injection molded or 3D printed.

Specimens for tensile tests according to DIN EN ISO 527-2 5A were prepared with 3D printing, namely:
  i) unidirectional specimens, or
  ii) multidirectional specimens.

Specimens for Charpy impact tests according to DIN EN ISO 179-1/1eA were prepared with 3D printing, namely:
  i) unidirectional specimens, or
  ii) multidirectional specimens.

For the unidirectional specimens i), the 3D printing was carried out with a filling pattern orientation at 0° or 90° relative to the stress (pulling/impact) direction, which corresponds with the length of the test specimens.

For the multidirectional specimens ii), each 3D printed layer was deposited with alternate filling pattern orientation at 0° and 90° as well as +45° and −45° relative to the stress direction.

The injection molded test specimens were cut from an injection molded plate of the polymer material, with the length of each test specimen oriented at 0° or 90° relative to the injection flow.

After determining the cross-sectional area, the tensile test specimens were clamped vertically and stretched to break.

The specific characteristics of the tensile tests were determined from the stress-strain diagrams obtained. The bone sized test specimens were subjected to testing at a pulling speed of up to 50 mm/min. The data were evaluated with the software TESTXPERT II V3.31. The results are listed as the mean of the tested specimen and the sample standard deviation.

After determining the cross-sectional area at the notch, the Charpy impact test specimens were fixed horizontally and impacted.

The specific characteristics of the impact test were determined from the dissipated energy. The results are listed as the mean of the tested specimen and the sample standard deviation.

Warpage

Warpage of printed objects was quantified by printing objects adapted from M. Spoerk et al. *Macromol. Mater. Eng.* 2017, 302, 1700143. as shown in FIG. 1 using a printing speed of 40 mm/s. The other printing conditions are reported in Table 3. The direction of the linear infill pattern was alternating ±45° layer by layer, wherein +45° indicates that the infill strands were oriented in parallel to the diagonal between corner 1 and corner 3 (see FIG. 1) and −45° indicates that the infill strands were oriented perpendicular to the infill strands of +45°. The first layer that adhered to the build plate had the infill orientation +45°.

After the print finished, the warpage specimens were removed from the build plate and tempered at (80±5)° C. in vacuum for (24±1) hours.

Figure 2:
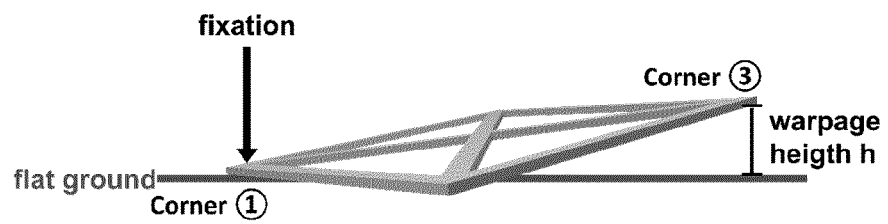
FIG. 2 is the side view of the warpage measurement setup, including the naming of the corners and the warpage height relevant for the measurement carried out.

After cooling the warpage specimen down, the warpage specimen was fixed to the ground at a horizontal distance of 2 mm from corner 1 with a 2 mm diameter rod as illustrated in FIG. 2.

The warpage height h, that is, the distance between the ground and the lower edge of corner 3 (FIG. 2) which was diagonal to the fixed corner 1, was measured for each warpage specimen.

Afterwards, corner 1 and corner 3 were fixed to the ground and the length of the diagonal d between the edges of corner 1 and corner 3 were measured.

The warpage (unit: %) was calculated using the following equation:

$$\text{Warpage [\%]} = \frac{\text{warpage heigth } h}{\text{length of diagonal } d} \cdot 100\%$$

Five specimens were printed and measured for each material composition. The results are listed as the mean of the tested specimen and the sample standard deviation.

Surface Quality

The surface quality was measured using a profilometer µSCAN SELECT from NANOFOCUS. The surface roughness was determined according to DIN EN ISO 4287:2010-07 quantified by the maximum height of the roughness profile $R_z$ and the arithmetic mean deviation of the roughness profile $R_a$ and according to DIN EN ISO 25178 quantified by the maximum height of the roughness profile $S_z$ and the arithmetic mean deviation of the roughness profile $S_a$. The total measured surface area was 10×10 mm², using a sampling frequency of 300 Hz and a step width of 20 µm.

For each material, the surface of one side wall of a cube of edge length 50 mm was measured. The cube was printed using a printing speed of 40 mm/s. The other printing conditions are reported in Table 3.

The side wall was oriented perpendicular to the build plate.

Propylene Polymer Composition (1)

Propylene composition (1) was prepared by compounding the following materials: 37 wt % of component A); 14 wt % of component B); 5 wt % of component C); 14 wt % of component D); 26 wt % of component E); 1 wt % of component F); and 3 wt % additives and pigments.

Component A) was HX CA 7201 heterophasic propylene copolymer, containing 52 wt % of propylene homopolymer; 26 wt % of ethylene 1-butene copolymer (55:45); and 22 wt % of propylene ethylene copolymer (46:54), and having a MFR of 12 g/10 min (ASTM D 1238-13 230° C./2.16 Kg, equivalent to ISO 1133). HX CA 7201 heterophasic propylene copolymer was commercially available from LyondellBasell.

Component B) was MC MF650Y propylene homopolymer, having an MFR of 2000 g/10 min and a soluble xylene at 25° C. fraction lower than 5 wt %. MC MF650Y propylene homopolymer was commercially available from LyondellBasell.

Component C) was KRATON G 1657 styrene-ethylene/butylene-styrene block copolymer, having a polystyrene content of 13 wt. % and a shore A (10 s) measured according to ASTM 2240 of 47. KRATON G 1657 styrene-ethylene/butylene-styrene block copolymer was commercially available from Kraton Polymers U.S. LLC (Houston, Texas).

Component D) was ENGAGE 7467, having density of 0.862 g/cm³ according to method ASTM D 79208, MFR of 1.2 g/10 min (ASTM D 1238-13 190° C./2.16 Kg, equivalent to ISO 1133), and hardness Shore A (ASTM D-2240-15) of 52. ENGAGE 7467 was commercially available from The Dow Chemical Co. Ltd.

Component E) was DS 2200-1OP glass fibers, having a diameter of 10 µm. DS 2200-10P glass fibers were commercially available from Binani 3B The Fibreglass Company.

Component F) was Polybond 3200 maleic anhydride grafted polypropylene. Polybond 3200 maleic anhydride grafted polypropylene was commercially available from Crompton.

The compounding was carried out on a Leistritz twin-screw extruder with a screw diameter of 50 mm. The parameters used are summarized in Table 1 below.

TABLE 1

Parameters for compounding propylene polymer composition (I) for further processing

| Parameter | Value |
| --- | --- |
| $T_{Zone\ 1}$/° C. | 180 |
| $T_{Zone\ 2-9}$/° C. | 200 |
| $T_{Zone\ 10}$/° C. | 210 |
| Revolutions/Number/min | 365 |
| Feed Rate/kg/h | 80 |

The resulting composition has a melt flow rate of 11 g/10 min (230° C./2.16kg) and a melting point of 163° C.

Comparative Composition 1 (CM1)

Comparative composition 1 was MOPLEN 2000HEXP ethylene propylene copolymer, filled with 25% by weight with glass fibers having an average length lower than 200 µm. MOPLEN 2000HEXP ethylene propylene copolymer was commercially available from LyondellBasell. The resulting composition had a melt flow rate of 15 g/10 min (230° C./2.16 kg) and a melting point of 165° C.

Comparative Composition 2 (CM2)

Comparative composition 2 (CM2) was INNOFIL3D PPGF30 filament of diameter 2.85 mm. The filament was commercially available from BASF. Innofil3D polypropylene homopolymer was filled with 30% by weight of glass fibers, having a melt flow rate of 7 g/10 min (230° C./2.16kg) and a melting point of 166° C.

Filament Extrusion

The filament for 3D printing from the polypropylene composition (I) and the comparison material (CM 1) was produced from granules on a twin-screw extruder COLLIN TEACH-LINE™ ZK 25T with a round die (3.00 mm diameter;). The extruded polymer strand was withdrawn, water cooled and rolled up on printer coils. The parameters used are listed in Table 2 below.

TABLE 2

| Parameter | propylene polymer composition (I): Value | CM1: Value |
|---|---|---|
| $T_{Zone\ 1}$/° C. | 190 | 180 |
| $T_{Zone\ 2}$/° C. | 190 | 180 |
| $T_{Zone\ 3}$/° C. | 180 | 170 |
| $T_{Zone\ 4}$/° C. | 175 | 160 |
| Revolutions/Number/min | 38 | 55 |
| Feed Rate/kg/h | 2.0 | 2.0 |
| Output/mm/s | 57 | 58 |

FFF (Fused Filament Fabrication) 3D Printing

All FFF printed parts were produced with an Ultimaker S5 FFF printer using 100% infill and a nozzle of 0.5 mm diameter leading to a line width of 0.48 mm. The layer thickness for the analysis of warpage and mechanical properties was 0.2 mm while, for surface quality analysis, the layer thickness was 0.1 mm. For surface quality analysis, a printing speed of 40 mm/s was used for the propylene polymer composition (I) and the comparison materials 1 and 2.

TABLE 3

| Material | Polypropylene composition (I) | CM1 | CM2 |
|---|---|---|---|
| Build plate material | glass + Dimafix | PP adhesive tape ("Scotch Extreme") | PP adhesive tape ("Scotch Extreme") |
| Nozzle diameter [mm] | 0.5 | 0.5 | 0.5 |
| Line width [mm] | 0.48 | 0.48 | 0.48 |
| Wall thickness [mm] | 1.44 (for surface quality measurements) 0.48 (for mechanical properties measurements) | 1.44 (for surface quality measurements) 0.48 (for mechanical properties measurements) | 1.44 (for surface quality measurements) 0.48 (for mechanical properties measurements) |
| Layer height [mm] | 0.2 (0.1 for surface analysis) | 0.2 (0.1 for surface analysis) | 0.2 (0.1 for surface analysis) |
| Nozzle temperature $1^{st}$ layer [° C.] | 220 | 240 | 240 |
| Nozzle temperature other layers [° C.] | 220 | 240 | 240 |
| Build plate temperature [° C.] | 100 | 100 | 30 |
| Infill [100] | 100 | 100 | 100 |
| Printer speed [mm/s] | 40 (for surface quality measurements) 25, 40, 100, or 150 (for mechanical properties measurements) | 40 (for surface quality measurements) 40 or 100 (for mechanical properties measurements) | 40 (for surface quality measurements) 40 or 100 (for mechanical properties measurements) |
| Infill pattern | lines | lines | lines |
| Printed build plate adhesion (Raft, Brim, etc.) | no | no | no |

Injection Molding

Injection molding of plates for tensile specimen DIN EN ISO 527-2 5A was performed on an injection molding system DEMAG 160 at 220° C., injection speed of 11 mm/s, 90 bar, and 30 s of holding pressure. The mold temperature was 30° C. The tensile specimen DIN EN ISO 527-2 5A were milled from the plates in parallel)(0°) or perpendicular) (90°) relative to the injection flow.

Injection molding of plates for impact specimen DIN EN ISO 179-1/1eA was performed on an injection molding system KRAUSS MAFFEI 110 at 220° C., injection speed of 13 mm/s, 90 bar, and 15 s of holding pressure. The mold temperature was 40° C. The impact specimen DIN EN ISO 179-1/1eA were milled from the plates parallel (0°) or perpendicular (90°) relative to the injection flow.

Mechanical Characterization Test Results

The filament of propylene composition (I) used for producing sample was compared with injection-molded sample. The results of the tests are reported in Table 4.

TABLE 4

| Example | Process | Printing speed [mm/s] | Printing/injection orientation relative to stress test direction | Mechanical properties | | |
|---|---|---|---|---|---|---|
| | | | | Tensile Modulus [MPa] | Tensile strength [MPa] | Impact strength [kJ/m$^2$] |
| 1 | FFF unidirectional | 25 | 0° | 2460 ± 50 | 29.4 ± 0.4 | 36.7 ± 1.0 |
| 2 | FFF unidirectional | 25 | 90° | 1020 ± 50 | 15.3 ± 0.2 | 17.4 ± 1.0 |
| 3 | FFF unidirectional | 40 | 0° | 2500 ± 40 | 30.3 ± 0.4 | 38.9 ± 0.7 |
| 4 | FFF unidirectional | 40 | 90° | 1010 ± 30 | 18.3 ± 0.3 | 18.3 ± 0.9 |
| 5 | FFF unidirectional | 100 | 0° | 2370 ± 30 | 29.2 ± 0.2 | 37.0 ± 1.2 |
| 6 | FFF unidirectional | 100 | 90° | 940 ± 30 | 16.3 ± 0.2 | 17.2 ± 0.4 |
| 7 | FFF unidirectional | 150 | 0° | 2280 ± 40 | 26.5 ± 0.3 | 34.7 ± 1.2 |
| 8 | FFF unidirectional | 150 | 90° | 890 ± 30 | 16.1 ± 0.3 | 16.9 ± 0.4 |
| 9 | FFF multidirectional | 40 | 0 + 90° | 1720 ± 50 | 21.5 ± 0.3 | 24.7 ± 0.7 |
| 10 | FFF multidirectional | 40 | −45 + +45° | 1530 ± 30 | 18.4 ± 0.3 | 29.1 ± 0.8 |
| CE1 | Injection molding | n.a. | 0° | 2300 ± 20 | 26.7 ± 0.9 | 27.2 ± 0.9 |
| | | | 90° | 990 ± 120 | 16.3 ± 0.2 | 15.5 ± 0.8 |

The filament of CM1 used for producing sample was compared with injection-molded sample. The results of the tests are reported in Table 5.

TABLE 5

| Example | Process | Printing speed [mm/s] | Printing/injection orientation relative to stress test direction | Mechanical properties | | |
|---|---|---|---|---|---|---|
| | | | | Tensile Modulus [MPa] | Tensile strength [MPa] | Impact strength [kJ/m$^2$] |
| CE1_1 | FFF unidirectional | 40 | 0° | 2990 ± 40 | 29 ± 2 | 17.9 ± 1.0 |
| CE1_2 | FFF unidirectional | 40 | 90° | 1190 ± 130 | 17.6 ± 0.8 | 7.1 ± 1.7 |
| CE1_3 | FFF unidirectional | 100 | 0° | 2810 ± 100 | 26.2 ± 0.7 | 14.1 ± 0.7 |
| CE1_4 | FFF unidirectional | 100 | 90° | 970 ± 100 | 16.4 ± 0.5 | 5.5 ± 0.9 |
| CE1_5 | FFF multidirectional | 40 | 0 + 90° | 1990 ± 80 | 22.2 ± 0.7 | 9.1 ± 0.9 |
| CE1_6 | FFF multidirectional | 40 | −45 + +45° | 1920 ± 90 | 20.9 ± 1.7 | 9.0 ± 1.1 |
| CE1_7 | Injection molding | n.a. | 0° | 4200 ± 100 | 54 ± 3 | 16 ± 2 |
| | | | 90° | 2240 ± 40 | 30 ± 0.3 | 9 ± 2 |

The filament of CM2 used for producing sample was compared with injection-molded sample. The results of the tests are reported in Table 6.

TABLE 6

| Example | Process | Printing speed [mm/s] | Printing orientation relative to stress test direction | Mechanical properties | | |
|---|---|---|---|---|---|---|
| | | | | Tensile Modulus [MPa] | Tensile strength [MPa] | Impact strength [kJ/m$^2$] |
| CE2_1 | FFF unidirectional | 40 | 0° | 3760 ± 130 | 20 ± 3 | 5.7 ± 0.7 |
| CE2_2 | FFF unidirectional | 40 | 90° | 2500 ± 300 | 33.5 ± 0.7 | 4.2 ± 0.5 |
| CE2_3 | FFF unidirectional | 100 | 0° | 3590 ± 80 | 16.8 ± 1.4 | 4.1 ± 0.7 |
| CE2_4 | FFF unidirectional | 100 | 90° | 2300 ± 300 | 30.2 ± 0.7 | 3.1 ± 0.4 |
| CE2_5 | FFF multidirectional | 40 | 0 + 90° | 3000 ± 300 | 38 ± 9 | 4.7 ± 0.2 |
| CE2_6 | FFF multidirectional | 40 | −45 + +45° | 2630 ± 160 | 37.8 ± 1.1 | 4.2 ± 0.3 |
| CE2_7 | Injection molding | n.a. | 0° | 5100 ± 80 | 60.0 ± 1.0 | 7.0 ± 0.4 |
| | | | 90° | 3350 ± 40 | 45.6 ± 0.5 | 4.8 ± 0.3 |

Warpage Characterization Test Results

Tables 10 reports the test results for warpage tests.

TABLE 10

| Example | Material | Warpage [%] |
|---|---|---|
| W1 | Polypropylene composition (I) | 2.0 ± 0.2 |
| W2 | CM1 | 12.6 ± 0.4 |
| W3 | CM2 | 23.1 ± 0.3 |

Surface Quality

Figure 3:
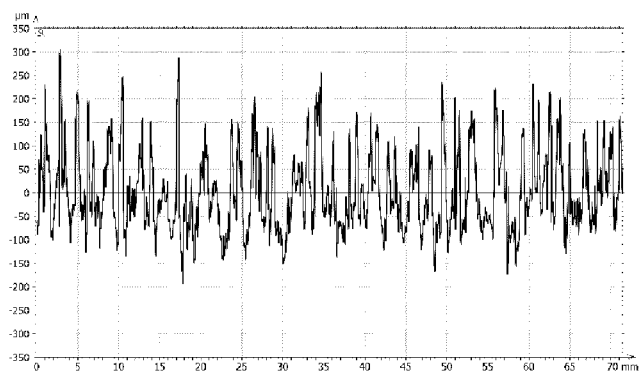
FIG. 3 is a chart depicting the surface quality (roughness) of polypropylene composition (I), determined from the side wall of a 3D printed cube.
Figure 4:
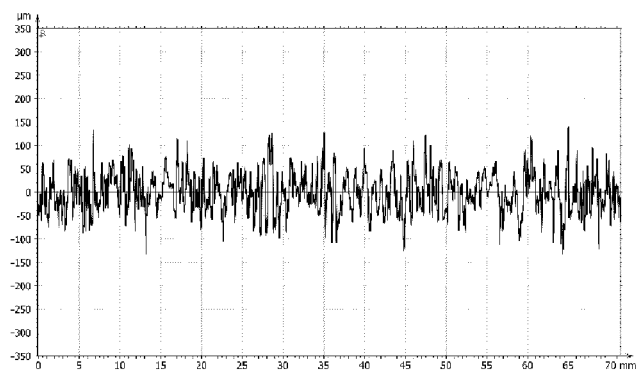
FIG. 4 is a chart depicting the surface quality (roughness) of comparison material 1, determined from the side wall of a 3D printed cube.
Figure 5:
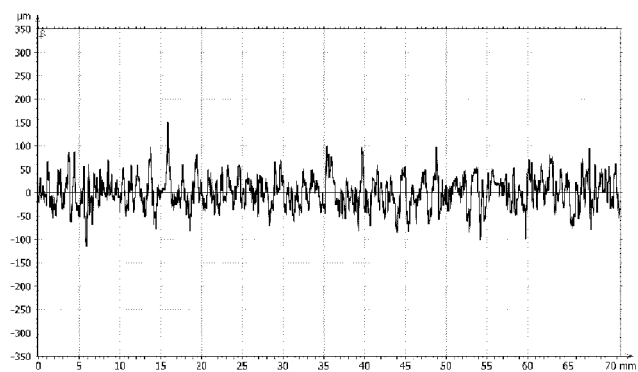
FIG. 5 is a chart depicting the surface quality (roughness) of comparison material 2, determined from the side wall of a 3D printed cube.

Table 11 reports surface roughness. FIGS. 3 to 5 illustrated the surface roughness of the side wall of cubes printed with the three different materials.

TABLE 11

| Example | Material | Side wall | | | |
|---|---|---|---|---|---|
| | | R$_z$ [µm] | R$_a$ [µm] | S$_z$ [µm] | S$_a$ [µm] |
| SQ1 | Polypropylene composition (I) | 374 | 66 | 594 | 66 |
| SQ2 | Comparison material 1 (CM1): ethylene propylene copolymer with 25% by weight glass fibers | 223 | 34 | 452 | 37 |
| SQ3 | Comparison material 2 (CM2): BASF Innofil3D PP GF30 | 161 | 25 | 288 | 27 |

In some embodiments and to reduce roughness, 3D printed articles are finished and smoothed by mechanical or thermal postprocessing. It is believed that the reduced visibility of the layer-by-layer structure from printed parts of the polypropylene composition (I) is not affected by the process.

What is claimed is:
1. A process for producing an article with an extrusion-based additive manufacturing system comprising the step of:
    extruding a flowable build material in the form of filament to produce strands, drops or beads, wherein the filament comprises a propylene polymer composition comprising:
        A) from 20% to 60% by weight of a heterophasic propylene copolymer;
        B) from 5% to 33% by weight of a propylene homopolymer or copolymer, wherein the copolymer contains up to 5% by weight of an alpha olefin selected from the group consisting of ethylene, 1-butene, 1-hexene and 1-octene;
        C) from 2% to 15% by weight of an elastomeric block copolymer comprising styrene;
        D) from 4% to 32% by weight of an elastomeric ethylene copolymer;
        E) from 5% to 50% by weight of a glass material as filler; and
        F) from 0.1% to 5% by weight of a compatibilizer,
        wherein the amounts of components A), B), C), D), E) and F) are referred to the total weight of A), B), C), D), E) and F), which amounts to 100% and wherein the melt flow rate MFR at 230° C. with a load of 2.16 kg, according to ISO (International Organization for Standardization) 1133-2:2011, is at least 1.0 g/10 min.; and
    fusing the strands, drops or beads to form the article.

2. The process for producing articles with an extrusion-based additive manufacturing system according to claim 1, wherein the propylene polymer composition comprises:
  A) from 25% to 52% by weight of a heterophasic propylene copolymer;
  B) from 8% to 23% by weight of a propylene homopolymer or copolymer, wherein the copolymer contains up to 5% by weight of an alpha olefin selected from the group consisting of ethylene, 1-butene, 1-hexene and 1-octene;
  C) from 3% to 10% by weight of an elastomeric block copolymer comprising styrene;
  D) from 6% to 23% by weight of an elastomeric ethylene copolymer;
  E) from 10% to 35% by weight of a glass material as filler, and
  F) from 0.3% to 3% by weight of a compatibilizer.

3. The process for producing articles with an extrusion-based additive manufacturing system according to claim 1, wherein component A) is a heterophasic propylene copolymer wherein a rubber phase is dispersed in the matrix, wherein
  the matrix is a propylene homopolymer or propylene ethylene copolymer having an ethylene content up to 10% by weight and a fraction soluble in xylene at 25° C. lower than 10% by weight; and
  the rubber phase is: (i) a propylene ethylene copolymer having an ethylene content ranging from 15% to 75% by weight; or (ii) an ethylene-C4-C8 alpha olefin copolymer having an ethylene content ranging from 35% to 70% by weight; or (iii) a mixture of propylene ethylene copolymer and ethylene-C4-C8 alpha olefin copolymer.

4. The process for producing articles with an extrusion-based additive manufacturing system according to claim 1, wherein component A) is a heterophasic propylene copolymer, wherein
  a rubber phase is dispersed in the matrix, wherein
    the matrix ranges from 30% to 70% by weight, referred to the total weight of the heterophasic copolymer, and
    the remaining part, up to 100% by weight, being the rubber phase.

5. The process for producing articles with an extrusion-based additive manufacturing system according to claim 1, wherein component A) is a heterophasic propylene copolymer wherein
  a rubber phase is dispersed in the matrix, wherein
    the matrix is a propylene homopolymer and
    the rubber phase is a mixture of propylene ethylene copolymer and ethylene-C4-C8 alpha olefin copolymer.

6. The process for producing articles with an extrusion-based additive manufacturing system according to claim 1, wherein component B) is a propylene homopolymer having a fraction soluble in xylene at 25° C. lower than 5% by weight.

7. The process for producing articles with an extrusion-based additive manufacturing system according to claim 1, wherein component C) is selected from the group consisting of styrene-ethylene/butylene-styrene block copolymers, styrene-ethylene/propylene-styrene block copolymers, styrene-butadiene-styrene block copolymers, and styrene-isoprene-styrene block copolymers containing from 5% to 30% by weight of polystyrene and having a hardness (Shore A, ASTM D-2240-15) value equal to or lower than 70 points.

8. The process for producing articles with an extrusion-based additive manufacturing system according to claim 1, wherein component D) has a hardness (Shore A, ASTM D-2240-15) value equal to or lower than 80 points.

9. The process for producing articles with an extrusion-based additive manufacturing system according to claim 1, wherein component D) is an elastomeric thermoplastic copolymer of ethylene with 1-butene having from 20% to 40% by weight of 1-butene and having density of less than 0.89 g/ml (measured according to ASTM D-792).

10. The process for producing articles with an extrusion-based additive manufacturing system according to claim 1, wherein component E) comprises glass fibers or chopped glass fibers whose average length is from 10 μm to 20 mm, or glass particles in the form of ground glass or milled glass fibers whose average particle size is in the range from 3 μm to 5 mm, or a combination thereof.

11. The process for producing articles with an extrusion-based additive manufacturing system according to claim 1, wherein component F) is a propylene polymer grafted with maleic anhydride.

* * * * *